(12) United States Patent
Bao et al.

(10) Patent No.: US 8,179,883 B2
(45) Date of Patent: May 15, 2012

(54) APPARATUS, METHOD AND SYSTEM FOR MANAGING SESSION ENCAPSULATION INFORMATION WITHIN AN INTERNET PROTOCOL CONTENT BYPASS ARCHITECTURE

(75) Inventors: Qi Bao, Westborough, MA (US); David Flanagan, Framingham, MA (US); Gerald R Joyce, Newton, MA (US); Michael W Patrick, Assonet, MA (US)

(73) Assignee: General Instrument Corporation, Horsham, PA (US)

( * ) Notice: Subject to any disclaimer, the term of this patent is extended or adjusted under 35 U.S.C. 154(b) by 329 days.

(21) Appl. No.: 12/140,830

(22) Filed: Jun. 17, 2008

(65) Prior Publication Data

US 2009/0310480 A1    Dec. 17, 2009

(51) Int. Cl.
*H04L 12/66* (2006.01)
(52) U.S. Cl. ........ 370/352; 370/217; 370/354; 370/401; 370/466; 725/110; 725/111
(58) Field of Classification Search ........................ None
See application file for complete search history.

(56) References Cited

U.S. PATENT DOCUMENTS

| | | | |
|---|---|---|---|
| 2002/0046406 A1* | 4/2002 | Chelehmal et al. | 725/87 |
| 2006/0225118 A1* | 10/2006 | Rolls et al. | 725/118 |
| 2007/0217436 A1* | 9/2007 | Markley et al. | 370/401 |
| 2007/0286138 A1* | 12/2007 | Kaftan | 370/338 |

OTHER PUBLICATIONS

PCT Search Report & Written Opinion, RE: Application #PCT/US2009/046545 Jul. 28, 2009.

* cited by examiner

*Primary Examiner* — Daniel J Ryman
*Assistant Examiner* — Aixa A Guadalupe

(57) ABSTRACT

An apparatus, method and system for delivering Internet Protocol (IP) content within a system that includes a bypass architecture, using a Session Encapsulation Information Database (SEIDB). Within an existing PacketCable Multimedia (PCMM) framework used as a control plane for IP content bypass flow setup, the SEIDB system stores session bypass encapsulation information for IP content bypass flows within the system. Within the SEIDB, each entry of bypass encapsulation information has a flow classifier component that uniquely identifies a bypass flow in a manner that allows both a cable modem termination system (CMTS) and the IP content source to uniquely identify the bypass flow at the SEIDB. Initially, the CMTS gathers bypass encapsulation information and uploads it to the SEIDB. Before the bypass flow begins, the IP content source obtains the necessary bypass encapsulation information from the SEIDB, e.g., using a flow classifier as a search filter item.

16 Claims, 8 Drawing Sheets

APPARATUS, METHOD AND SYSTEM FOR MANAGING SESSION ENCAPSULATION INFORMATION WITHIN AN INTERNET PROTOCOL CONTENT BYPASS ARCHITECTURE

BACKGROUND OF THE INVENTION

1. Field of the Invention

The invention relates to the delivery of Internet Protocol (IP) content over cable systems using a standard protocol Data Over Cable System Interface Specification (DOCSIS). More particularly, the invention relates to transmitting IP content within systems involving Cable Modem Termination System (CMTS) architecture and processing.

2. Description of the Related Art

Most cable systems currently provide video (and data) content delivery services via digital broadcast. The video image is first digitized, and then compressed, e.g., via one of several digital algorithms or compression standards, such as the MPEG2 (Moving Pictures Expert Group) algorithm or the MPEG4 part 10 algorithm, where the latter also is known as the International Telecommunications Union (ITU) H.264 standard. These compression standards allow the same video content to be represented with fewer data bits. Using MPEG2, standard definition television currently can be transmitted at a rate of approximately 4 Megabits per second (Mbps). Using MPEG 4 Part 10, the same video content can be transmitted at a rate of approximately 2 Mbps. The digital video content typically is transmitted from a source at a cable provider's headend to one or more network elements, such as an end user's set-top box (or other suitable video processing device), via a digitally modulated radio frequency (RF) carrier, with the video content organized into an MPEG2 Transport Stream (MPEG2-TS) format.

Cable system operators are considering Internet Protocol (IP)-based methods for delivery of content, such as IP-video and IP Television (IPTV), to supplement their current digital video delivery methods. The internet protocol is not required for MPEG2 Transport Streams. However, IP-based video delivery allows the possibility of new video sources, such as the Internet, and new video destinations, such as end user IPTV playback devices. If cable systems do include IP-based content delivery, it is quite possible and likely that relatively large amounts of bandwidth will be needed to deliver IPTV content to end users. Moreover, as end users continue to shift their viewing desires toward on-demand applications, a relatively large percentage of such on-demand content likely will be IPTV content.

To cope with the anticipated surge of IPTV viewing, the cable industry developed the Data Over Cable System Interface Specification (DOCSIS®) standard or protocol, including the DOCSIS 3.0 standard. In general, DOCSIS defines interface requirements for cable modems involved in high-speed data distribution over cable television system networks. The cable industry also developed the Cable Modem Termination System (CMTS) architecture and the Modular CMTS (M-CMTS™) architecture for this purpose. In general, a CMTS is a component, typically located at the headend or local office of a cable television company, that exchanges digital signals with cable modems on a cable network.

In general, an EdgeQAM (EQAM) or EQAM modulator is a headend or hub device that receives packets of digital content, such as video or data, re-packetizes the digital content into an MPEG transport stream, and digitally modulates the digital transport stream onto a downstream RF carrier using Quadrature Amplitude Modulation (QAM). EdgeQAMs are used for both digital broadcast, and DOCSIS downstream transmission. In a conventional IPTV network system arrangement using M-CMTS architecture, the EdgeQAMs are downstream DOCSIS modulators, and are separated from a core portion of the M-CMTS core. An IPTV server or other suitable IP content provider is coupled to a regional area or backbone network. This backbone network, in turn, is connected to a converged interconnect network (CIN) which also links the M-CMTS core and the EdgeQAMs. The CIN performs as one or more access routers or switches, i.e., devices configured for routing data in an IP network. There is a Layer Two Tunneling Protocol version 3 (L2TPv3) tunnel from the M-CMTS core to the EdgeQAMs, with this tunnel being identified as a Downstream External Physical Interface (DEPI). The IPTV content is carried on the downstream DOCSIS RF carrier from the EdgeQAM to one or more end user network elements, such as a DOCSIS set-top box or an Internet Protocol set-top box (IP-STB). An IP set-top box is a set-top box or other multimedia content processing device that can use a broadband data network to connect to television channels, video streams and other multimedia content. An upstream DOCSIS receiver is coupled to and receives data, such as on-demand commands, from the end user multimedia content processing device. Upstream DOCSIS receivers are combined with or contained within a core portion of the M-CMTS component.

In general, for conventional M-CMTS architecture, all packets traveling upstream or downstream typically travel through the M-CMTS core for appropriate forwarding to the correct network interface or DOCSIS carrier. However, since the downstream DOCSIS modulators (i.e., the EQAMs) are separate from the M-CMTS core, the downstream packets travel from the M-CMTS core, through the CIN, and to the EQAMs on special "tunnel" or "pseudo-wire" connections. These tunnels, which are defined by the Layer Two Tunneling Protocol (L2TP) version 3 (i.e., L2TPv3), are known within the DOCSIS 3.0 standard as Downstream External Physical Interface (DEPI) tunnels, and typically are in the form of gigabit Ethernet fiber links.

One of the features of the DOCSIS 3.0 specification intended to facilitate the use of IPTV content delivery is that the number of downstream EQAMs can be increased independently of the number of upstream DOCSIS data channels. Hence, the downstream DOCSIS capacity can be arbitrarily increased to whatever bandwidth is needed. However, as discussed, downstream IPTV content or data packet flow from the IPTV server to the end user DOCSIS network elements conventionally is required to travel through the CIN to the M-CMTS core, then from the M-CMTS core, on a DEPI tunnel, back through the CIN again, and then on to the EQAM. Such "hairpin" forwarding of downstream data packets back through the CIN requires a disproportionate amount of switching bandwidth and other resources compared to other portions of the system.

Accordingly, there has been a need to provide a bypass architecture that overcomes or avoids the issues involved with data packet flow from the M-CMTS core back through the CIN and then on to the EQAM. Such a bypass architecture might involve or include direct tunneling of video content controlled by and transmitted from a multiple systems operator (MSO) to a downstream modulator, such as a low-cost downstream EQAM, in a manner that bypasses the CMTS, including the M-CMTS core. However, within such a bypass system, to achieve proper bypass, the various MSO-controlled IP content sources, including video servers, would be required to have encapsulation information of DOCSIS framing, as well as tunneling information of the EQAM. However, such IP content sources typically do not have such information. Typically, only the CMTS and CMTS peripherals, such as the EQAM Edge Resource Manager (ERM), have such information. Accordingly, there is a need for a control plane for such bypass systems that allows IP content sources, including video servers, to obtain necessary bypass encapsulation information so that bypass content flows can be properly established with appropriate CMTS quality of service (QoS) support.

DETAILED DESCRIPTION

Figure 1:
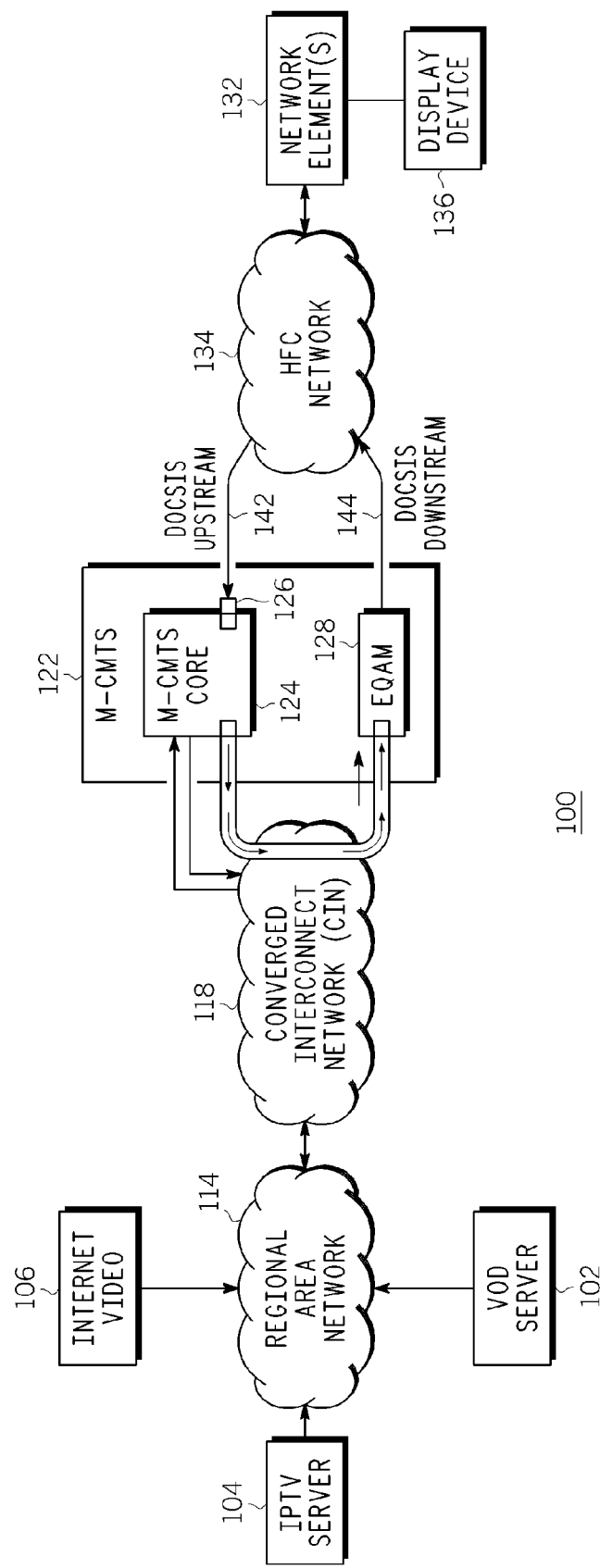
FIG. 1 is a block diagram of a conventional Internet Protocol (IP) content delivery system, including a conventional modular Cable Modem Termination System (M-CMTS) network.

In the following description, like reference numerals indicate like components to enhance the understanding of the bypass architecture apparatus, methods and systems through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The apparatus, methods and systems described herein involve using an existing PacketCable Multimedia (PCMM) framework or other suitable existing framework as a control plane for IP content bypass flow setup and adding a Session Encapsulation Information Database (SEIDB) system component to the existing framework. The SEIDB is configured to store session bypass encapsulation information for IP content bypass flows within the system. Within the SEIDB, each entry of bypass encapsulation information for a bypass flow has a flow classifier component that uniquely identifies a bypass flow in a manner that allows both the Cable Modem Termination System (CMTS) and the IP content sources, including video servers, to uniquely identify the bypass flow at the SEIDB. Initially, once the CMTS has been triggered by the PCMM system for a new IP content bypass session, e.g., using a new SessionClassID within the PCMM Gate-Set command, the CMTS gathers necessary bypass encapsulation information. The CMTS then uploads the gathered bypass encapsulation information to the SEIDB. After such upload, the CMTS continues with the rest of PCMM setup procedure for the bypass flow, e.g., in a conventional manner. Then, before the bypass flow begins, the IP content source establishes a communication with the SEIDB to obtain the necessary bypass encapsulation information, e.g., using a flow classifier as a search filter item. By using the existing PCMM or other system framework to set up bypass flows, no change to the existing system setup procedure is required while achieving QoS provisioning for bypass flows. Also, the SEIDB is independent of any one IP content source or server, thus allowing multiple sources and video servers to work simultaneously with the CMTS in an asynchronous way to achieve better scalability.

Referring now to FIG. 1, shown is a block diagram of a conventional Internet Protocol (IP) content delivery system 100 including a conventional modular Cable Modem Termination System (M-CMTS) network arrangement. The system 100 includes one or more sources of IP content, e.g., one or more video on demand (VOD) servers 102, IPTV broadcast video servers 104, Internet video sources 106, or other suitable sources for providing IP content. The IP content sources are connected to a regional area or backbone network 114. The regional area network 114 can be any communication network or network server arrangement suitable for transmitting IP content. For example, the regional area network 114 can be or include the Internet or an IP-based network, a computer network, a web-based network or other suitable wired or wireless network or network system.

Coupled to the regional area network 114 is a converged interconnect network (CIN) 118, which includes the routing and switching capability for connecting the regional area network 114 to a Cable Modem Termination System (CMTS), such as a modular CMTS (M-CMTS) 122. In general, as discussed hereinabove, the CIN typically performs as an access router for routing data in an IP network. The CIN typically has gigabit Ethernet interfaces and can perform layer 2/3/4 forwarding, i.e., routing of data in layers 2, 3 and 4 as defined according to the seven-layer Open Systems Interconnection (OSI) network protocol. In general, a CMTS or an M-CMTS is a component that exchanges digital signals with network elements (such as network elements including cable modems, set-top boxes and other content processing devices, and media terminal adapters) on a cable network. The CMTS or M-CMTS typically is located at the local office of a cable television company.

The M-CMTS 122 includes an M-CMTS core 124, which typically includes or contains one or more upstream receivers 126, such as an upstream DOCSIS receiver. The M-CMTS 122 also includes one or more downstream DOCSIS modulators, such as one or more EdgeQAMs (EQAMs) 128, which are external to and not part of the M-CMTS core 124. The M-CMTS 122 typically is connected to one or more network elements 132, such as an end user cable modem, a set-top box, a media terminal adapter (MTA) or other suitable end user or customer premises equipment (CPE). The network elements 132 may include an associated display device 136 coupled thereto. The M-CMTS 122 typically is connected to the network elements 132 via an end user network, which typically is a Hybrid Fiber Coaxial (HFC) cable network 134 and/or other suitable end user network or network system.

The upstream receiver 126 is configured to receive upstream IP/DOCSIS transmissions, such as on-demand commands from an end user set-top box. The upstream data is transmitted to the upstream receiver 126 via the network 134 and an upstream data channel 142 coupled between the network 134 and the upstream receiver 126. The M-CMTS core 124, which includes the upstream receiver 126, converts the received upstream data to Internet Protocol (IP) packets, which then are sent to an IP router, or other suitable device or component, for transmission across the CIN 118 and the regional area network 114. For downstream data, the M-CMTS 122 uses one or more EQAMs 128 or other suitable downstream modulators to convert the IP packet data to a DOCSIS formatted transport stream or other suitable digital transport stream and modulate the digital transport stream onto a downstream RF carrier using Quadrature Amplitude Modulation (QAM) to the network elements 132. The downstream data is transmitted from the EQAM 128 to the network elements 132 via the network 134 and a downstream data channel 144 coupled between the EQAM 128 and the network 134.

One or more of the components within the M-CMTS 122, including one or more of the M-CMTS core 124, the upstream receiver 126 and the EQAM 128 can be comprised partially or completely of any suitable structure or arrangement, e.g., one or more integrated circuits. Also, it should be understood that the M-CMTS 122 includes other components, hardware and software (not shown) that are used for the operation of other features and functions of the M-CMTS 122 not specifically described herein. Also, the M-CMTS 122 can be partially or completely configured in the form of hardware circuitry and/or other hardware components within a larger device or group of components. Alternatively, the M-CMTS 122 can be partially or completely configured in the form of software, e.g., as processing instructions and/or one or more sets of logic or computer code. In such configuration, the logic or processing instructions typically are stored in a data storage device (not shown). The data storage device typically is coupled to a processor or controller (not shown). The processor accesses the necessary instructions from the data storage device and executes the instructions or transfers the instructions to the appropriate location within the M-CMTS 122.

A DOCSIS 3.0 cable modem and other network elements are able to receive multiple downstream channels 144. According to the DOCSIS 3.0 standard, there may be "primary" and "non-primary" downstream channels. Of these, one and only one downstream channel will be the "primary" downstream channel of the network elements. The network elements will only receive synchronization time-stamps, which are necessary for upstream operation and which are known as SYNC messages, on its primary downstream channel. Thus, the "primary" channel is also a "synchronized" channel. The network elements also rely on the "primary" channel for the delivery of Mac Domain Descriptor (MDD) messages, which enable the network elements to perform operations including plant topology resolution and initial upstream channel selection. During initialization, the network elements are only required to receive Upstream Bandwidth Allocation Maps (MAPs) and Upstream Channel Descriptors (UCDs) on its "primary" downstream channel.

In systems using M-CMTS architecture, the IP data packets traveling upstream or downstream typically travel through the M-CMTS core 124 for appropriate processing and subsequent forwarding to the correct network interface or data carrier, such as a DOCSIS RF carrier. Since the upstream receiver 126 is combined with the M-CMTS core 124 and its processing, upstream data received by the upstream receiver 126 can be transmitted directly from the upstream receiver 126 to the M-CMTS core 124 and then forwarded appropriately. However, since the downstream modulator (EQAM 128) is not part of the M-CMTS core 124, downstream data received by the M-CMTS 122 from the CIN 118 travels first through the M-CMTS core 124 for appropriate processing and then is directed to the EQAM 128 for appropriate conversion and modulation. Downstream data packets from the M-CMTS core 124 conventionally must travel back through the CIN 118 and then to the EQAM 128 using special "tunnel" or "pseudo-wire" connections, such as downstream or DOCSIS Downstream External Physical Interface (DEPI) tunnels. As discussed hereinabove, such "hairpin" forwarding from the M-CMTS core 124 back through the CIN 118 to the EQAM 128 will require a disproportionate amount of switching bandwidth for the M-CMTS core 124 and the CIN 118.

Figure 2:
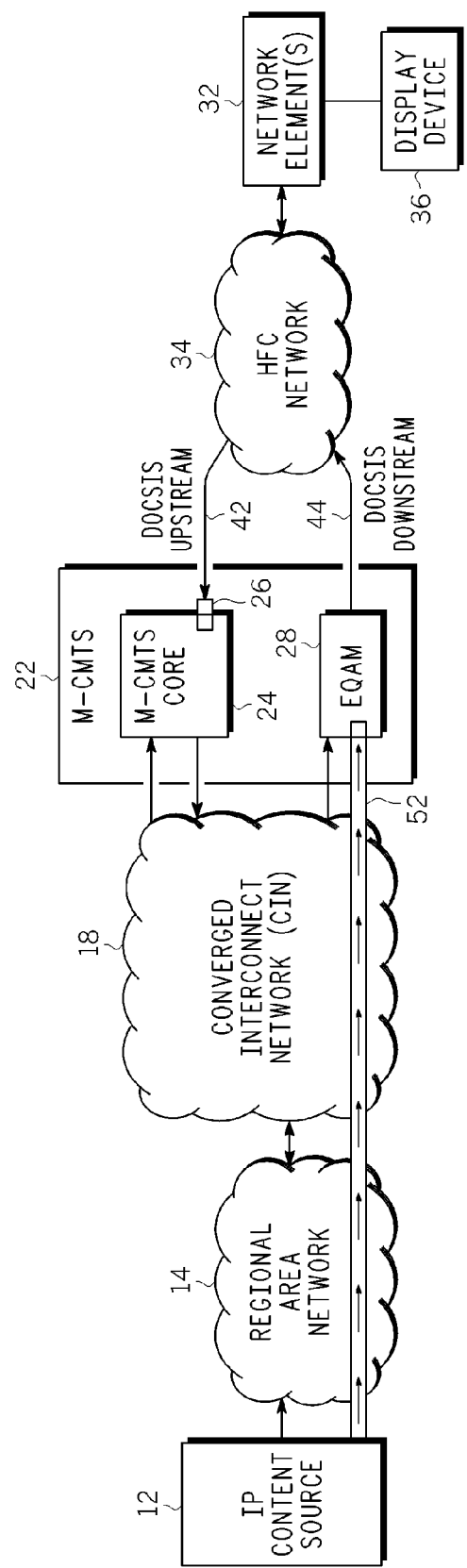
FIG. 2 is a block diagram of an IP content delivery system, including a DOCSIS IP-video Bypass Architecture (DIBA), in which the IP content bypasses the M-CMTS core.

Referring now to FIG. 2, shown is a block diagram of an IP content delivery system 50 including M-CMTS bypass architecture. In the system 50, downstream content or traffic travels directly from one or more IP content sources 12 to an EQAM 28, e.g., via a regional area network 14 and a CIN 18, thus bypassing an M-CMTS 22 and its M-CMTS core 24. The downstream content travels directly to the EQAM 28 using one or more suitable connections (shown generally as a connection 52). For example, the connection 52 can be one or more "tunnel" or "pseudo-wire" connections, such as a DEPI tunnel. As will be discussed in greater detail hereinbelow, content that is tunneled or otherwise transmitted directly from the IP content source 52 to the EQAM 28 emerges from the EQAM 28 with partial or full DOCSIS framing, suitable for forwarding through to DOCSIS-compatible end user network elements, such as an end user cable modem that is DOCSIS-compatible. In general, the system 50 accomplishes the functionality of an M-CMTS without the associated cost. Conventionally, the M-CMTS does allow the addition of corresponding EQAMs to the system without having to increase the number of upstream data channels, providing some system flexibility. However, the bypass architecture, e.g., as shown in FIG. 2, provides the additional advantage of allowing additional EQAMs, without having to add additional processing capacity to the M-CMTS core 24, or the CIN 18, which would be relatively expensive.

Also, alternatively, an M-CMTS bypass architecture can be used in systems that include an integrated CMTS, rather than a more expensive M-CMTS. In this manner, the bypass architecture makes it possible to deploy an integrated CMTS with additional external DEPI EQAMs. The integrated CMTS includes a "synchronized" or "primary" downstream DOCSIS data channel from the integrated CMTS to the end user network elements, in addition to the downstream DOCSIS data channels from the EQAM to the end user network elements, which may be "synchronized" or "non-synchronized."

Figure 3:
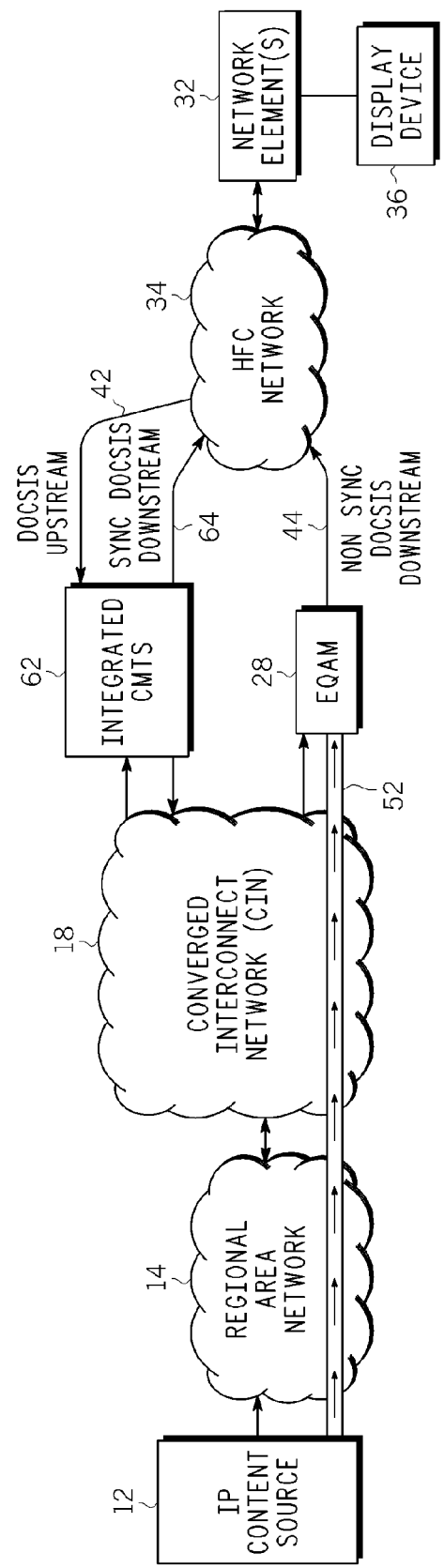
FIG. 3 is a block diagram of an IP content delivery system with an integrated CMTS network, also including a DOCSIS IP-video Bypass Architecture (DIBA), in which the IP content bypasses an integrated CMTS.

Referring now to FIG. 3, shown is a block diagram of an IP content delivery system 60 including an integrated CMTS network, and including a bypass architecture in which the IP content bypasses the integrated CMTS. The system 60 includes an integrated CMTS 62, which differs from an M-CMTS in that it also includes a downstream DOCSIS data channel 64 coupled to end user network elements 32, e.g., via an HFC network 34. Network elements 32 can include one or more end user network elements, such as a cable modem, a set-top box, a media terminal adapter (MTA) or other suitable end user or customer premises equipment (CPE). The downstream DOCSIS data channel 64 is fully functional, containing synchronization timestamps, and thus is considered to be "primary" or "synchronized." By comparison, the downstream DOCSIS data channel 44 from the EQAM 28 to the network elements 32 (via the HFC network 34), which carries IP content, can be configured to operate without synchronization timestamps, and thus may, in that case, be considered to be "non-synchronized."

Because IP content can be delivered to DOCSIS cable modems and other network elements 32 using non-synchronized downstream data channels, the EQAM 28 can be used to deliver IP content even when the EQAM 28 is not synchronized to the DOCSIS master clock with the DOCSIS Timing Interface (DTI) (not shown), which is part of the integrated CMTS 62. DOCSIS modems require DOCSIS master clock synchronization on only one synchronized data channel, i.e., the so-called "primary" downstream data channel. Therefore, such synchronization can be supplied by the integrated CMTS 62, via the "synchronized" downstream DOCSIS data channel 64. Alternatively, such synchronization can be supplied by a single M-CMTS EQAM that is synchronized to the DOCSIS master clock with the DOCSIS DTI.

By using the CMTS bypass architecture, the system 60 avoids the expense of the CMTS (or the M-CMTS) having to establish or generate both synchronized and non-synchronized downstream data channels for delivery of IP content. A single synchronized data channel from the integrated CMTS 62 or its core can provide the synchronization timestamps, and also provide other DOCSIS Media Access Control (MAC) functions, including instructing the network elements 32 when to transmit upstream and delivering other MAC layer messages for various network element functions, such as registration and maintenance. One or more non-synchronized DOCSIS data channels can be established or generated for one or more EQAMs 28. A non-synchronized DOCSIS data channel generated for an EQAM is less expensive than generating a synchronized DOCSIS data channel for an integrated CMTS or an M-CMTS. Also, with an integrated CMTS and no timestamps in the non-synchronized data channel, the DTI (which is required in the M-CMTS architecture) is not necessary in systems using CMTS bypass architecture.

Depending on the content source 12, the regional area network 14 and the CIN 18, as well as the type of EQAM 28, IP content delivery systems using CMTS bypass architecture can use many different tunneling techniques and therefore have many suitable bypass data encapsulations. Data encapsulation generally is the process of taking a packet of a particular format that contains data as its payload, and enveloping or encapsulating that entire packet as the payload of a new packet. The new packet is generally formed by adding additional header fields, of a different format, to the old packet, which becomes the payload. The outermost header must be compatible with the device receiving the data. If the EQAM 28 is an M-CMTS DEPI EQAM (DEPI EQAM), data encapsulation can occur using at least two DEPI tunneling techniques. Using either tunneling technique, the content source 12 generates or originates an L2TPv3 (DEPI) tunnel to the DEPI EQAM. In the first DEPI tunneling technique, known as the DOCSIS Packet Stream Protocol (PSP), IP content is encapsulated into DOCSIS MAC frames or data packets, i.e., DOCSIS frames are transported in the L2TPv3 tunnel payload (data). In general, the PSP allows DOCSIS frames to be appended together in a queue, using either concatenation (to increase network performance) or fragmentation (if tunneled packets are too large). The PSP DEPI tunneling technique allows the EQAM 28 to mix both IP content originated from the IP content sources 12 with non-IP content, such as VOIP (Voice over Internet Protocol) data originated from the M-CMTS core 24, on the same DOCSIS downstream data carrier.

In the second DEPI tunneling technique, known as DOCSIS MPEG Transport (D-MPT), multiple 188-byte MPEG2 Transport Stream (MPEG-TS) packets are transported in the L2TPv3 tunnel payload. In D-MPT, IP content is encapsulated into DOCSIS MAC frames and the DOCSIS MAC frames are encapsulated into MPEG-TS packets. All DOCSIS frames, including packet-based frames and any necessary MAC management-based frames, are included within the one D-MPT data flow. The EQAM receiving the D-MPT data flow searches the D-MPT payload for any DOCSIS SYNC messages and performs SYNC corrections. The EQAM then forwards the D-MPT packet to the RF interface, for transmission on the RF data carrier. Using the D-MPT tunneling technique, MPEG packets can be received by the EQAM and forwarded directly to the RF interface without having to terminate and regenerate the MPEG framing. The only manipulation of the D-MPT payload is the SYNC correction.

Alternatively, the EQAM 28 can be a standard MPEG2 Transport Stream (MPEG2-TS) EQAM. If the EQAM 28 is an MPEG2-TS EQAM, the IP content source 12 can transmit IP content in PSP formatted data packets. In such case, a PSP/MPT converter is used to convert the data format into an MPEG2-TS format, which an MPEG2-TS EQAM can process. The PSP/MPT converter can be attached to or embedded within the CIN 18 or one or more networking devices within the CIN 18. Alternatively, the IP content source 12 can directly generate and transmit IP content in MPT formatted data packets, which the MPEG2-TS EQAM can process.

As discussed hereinabove, the use of a CMTS bypass or other bypass architecture within an IP content delivery system requires various encapsulation information for proper IP content bypass flows. For example, to achieve proper bypass, the IP content servers need to have DOCSIS encapsulation information, as well as selected EQAM information, e.g., tunneling information of the EQAM. The CMTS and CMTS peripherals, such as the EQAM Edge Resource Manager (ERM), have such information, however, the IP content servers and other IP content sources typically do not have such information.

Figure 4:
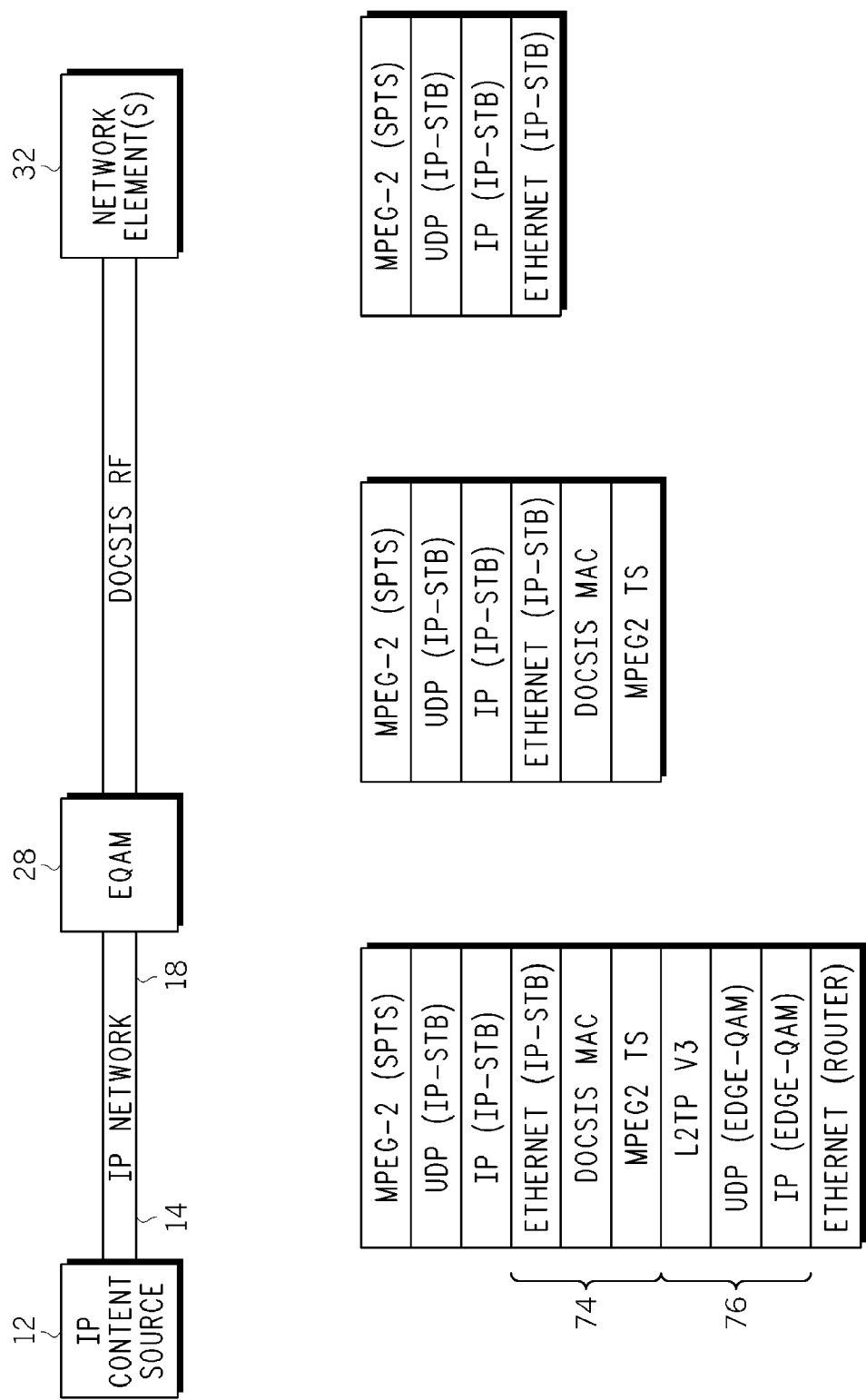
FIG. 4 is a block diagram of data encapsulations at various stages in the IP content delivery systems of FIG. 2 and FIG. 3.

For example, referring now to FIG. 4, shown is a block diagram of data encapsulations at various stages in the IP content delivery systems of FIG. 2 and FIG. 3. The data encapsulation 72 at the stage between the IP content source 12 and the EQAM 28, via the IP network (e.g., the regional area network 14 and the CIN 18), includes several DOCSIS encapsulation layers 74 inserted into the existing layers. Also, the data encapsulation 72 includes several IP content source outer encapsulation layers 76. However, of the inserted DOCSIS encapsulation layers 74, the Ethernet layer and the DOCSIS MAC layer are unknown to the IP content source 12. Also, of the IP content source outer encapsulation layers 76, the UDP (EQAM) layer and the IP (EQAM) layer are unknown to the IP content source 12.

The apparatus, methods and systems described herein provide an efficient and effective way for the IP content sources to obtain the necessary encapsulation information and other information needed for proper IP content bypass flows. The apparatus, methods and systems described herein also provide a control plane, using the existing system framework, for such bypass architectures that allows the IP content sources to obtain bypass encapsulation information needed for proper IP content bypass flows, as well as appropriate control plane signaling to set up the IP content bypass flows.

Figure 5:
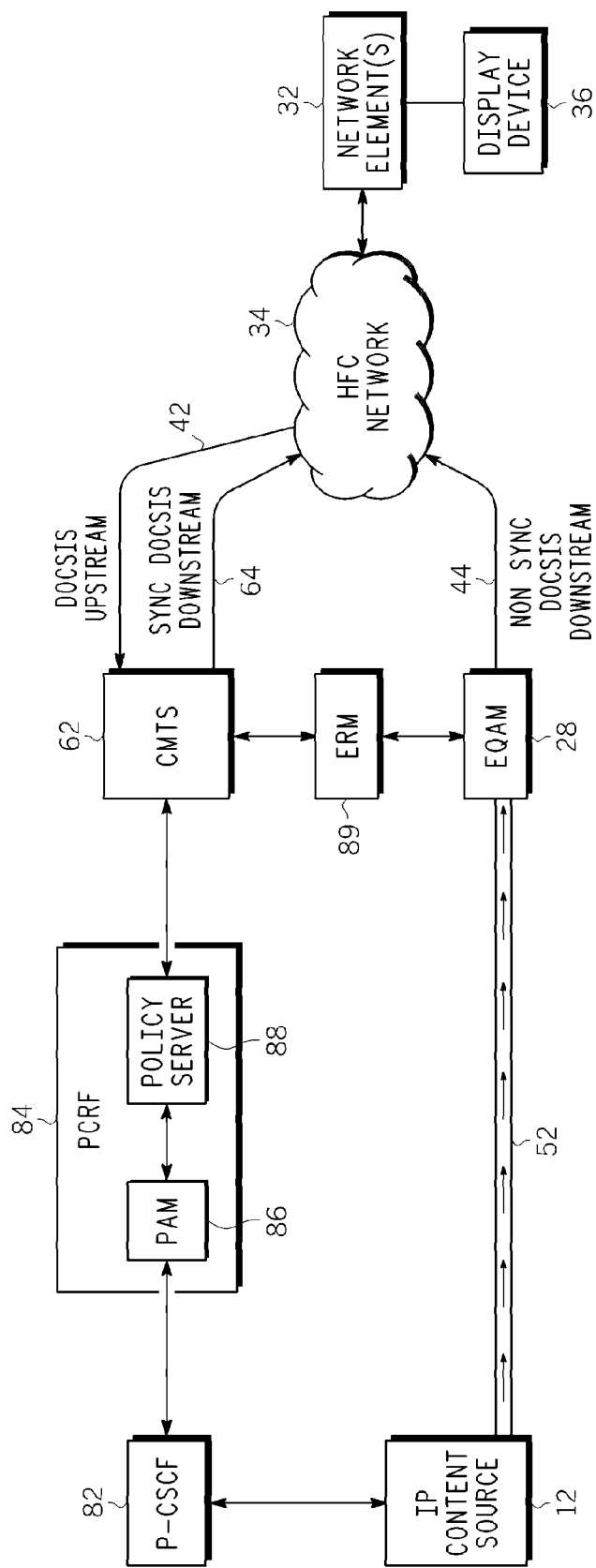
FIG. 5 is a block diagram of an IP content delivery system according to the PacketCable Multimedia (PCMM) architecture specifications, and including a bypass architecture.

Referring now to FIG. 5, shown is a block diagram of an IP content delivery system 80 according to the PacketCable Multimedia (PCMM) architecture specifications, including a bypass architecture. The PCMM specifications define a framework for providing Quality of Service (QoS), security and resource allocation and management for any type of service within a DOCSIS network.

The PCMM framework includes a Proxy Call Session Control Function (P-CSCF) 82 coupled to the IP content source(s) 12. In general, the P-CSCF 82 provides connectivity to the PacketCable network for the IP content source 12. Also, the P-CSCF 82 is responsible for reserving, committing and releasing Quality of Service (QoS) resources for a given IP content flow session. Messages between the P-CSCF 82 and the IP content source 12, including registration and session control messages, are exchanged using an appropriate protocol, e.g., the session initiation protocol (SIP), and using an appropriate interface therebetween, such as a Gm interface.

The PCMM framework also includes a Policy and Charging Rules Function (PCRF) 84 coupled between the P-CSCF 82 and the CMTS 62. The PCRF 84 includes a PacketCable Application Manager (PAM) 86 coupled to the P-CSCF 82 and a Policy Server 88 coupled between the PAM 86 and the CMTS 62. The PAM 86 is a specialized application manager primarily responsible for determining the QoS resources needed for a session, based on the received session descriptors from the P-CSCF 82, and managing the QoS resources allocated for the session. The Policy Server 88 generally is a system that primarily acts as an intermediary between the PAM 86 and the CMTS 62. The Policy Server 88 applies network policies to requests by the PAM 86 and proxies messages between the PAM 86 and the CMTS 62.

The session-based policy set-up information exchanged between the P-CSCF 82 and the PAM 86 occurs using an appropriate protocol, e.g., the Diameter protocol, and using an appropriate interface therebetween, such as an Rx interface. The requests, messages and other information exchanged between the PAM 86 and the Policy Server 88 occurs using an appropriate protocol, e.g., the Common Open Policy Service (COPS) protocol. Also, the messages and information exchanged between the Policy Server 88 and the CMTS 62 occurs using an appropriate protocol, such as the COPS protocol.

An edge resource manager (ERM) 89 is shown coupled between the CMTS 62 and the EQAM 28. In general, the ERM 89 allocates and manages the resources of the edge devices, e.g., the EQAM 28. The ERM 89 also communicates with and receives instructions from a session manager (not shown), which typically is located in the CMTS 62. The information exchanged between the ERM 89 and the EQAM 28 occurs according to the DOCSIS specification, e.g., using the Real Time Streaming Protocol (RTSP).

Figure 6:
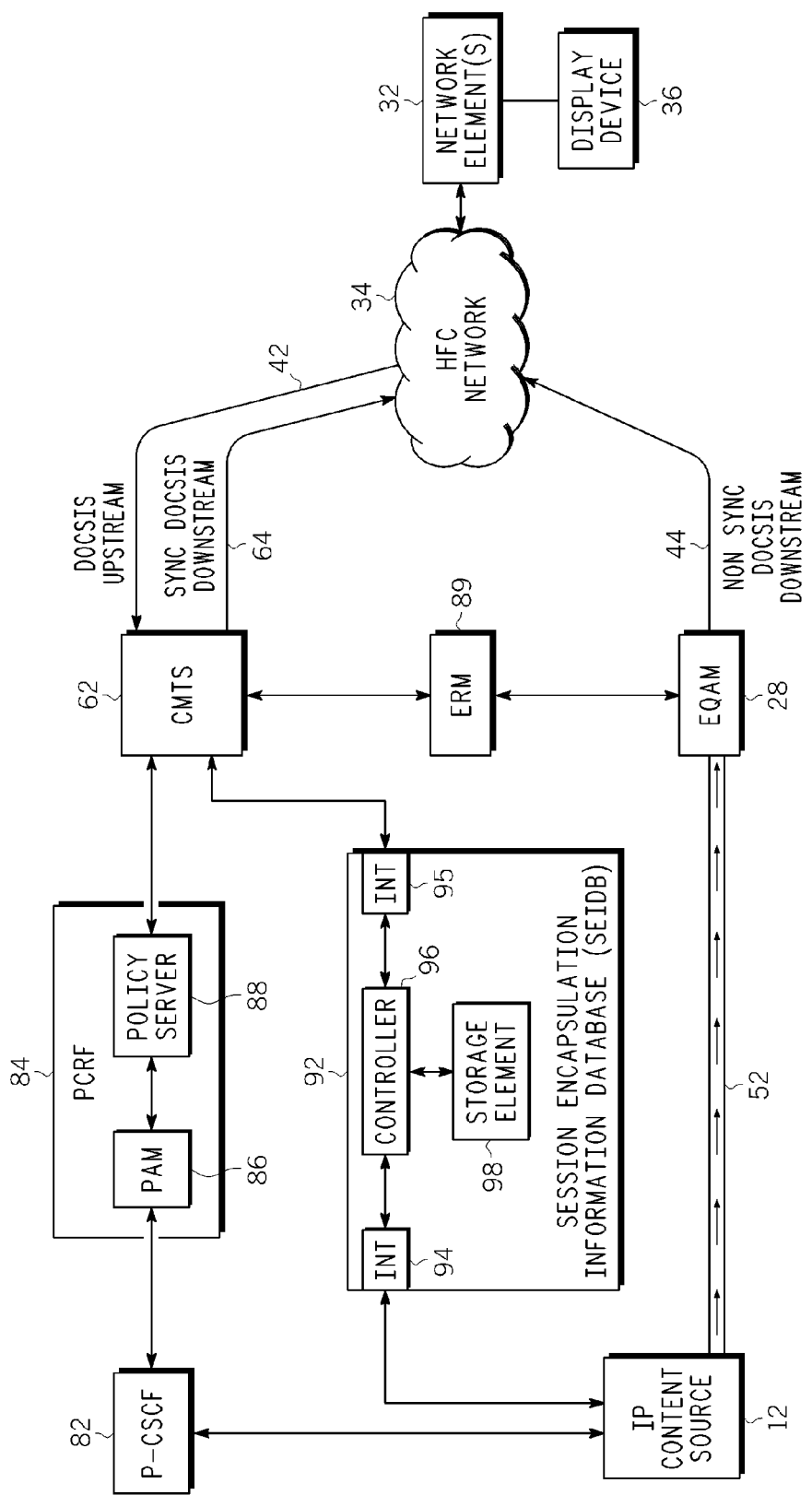
FIG. 6 is a block diagram of an IP content delivery system using the PCMM 2.0 framework, including a bypass architecture, and including the Session Encapsulation Information Database (SEIDB)

Referring now to FIG. 6, shown is a block diagram of an IP content delivery system 90 according to the PCMM architecture specifications, including a bypass architecture and including a Session Encapsulation Information Database (SEIDB) 92. The SEIDB 92 is added to the existing PCMM framework as the control plane for IP content bypass flow setup. The SEIDB 92 is shown coupled between the IP content source 12 and the CMTS 62, although the SEIDB 92 can be located anywhere within the system 90 as long as the SEIDB 92 can communicate properly with the IP content source 12 and other necessary system components, such as the CMTS 62. When coupled to the IP content source 12, the SEIDB 92 exchanges information with the IP content source 12 using an appropriate protocol, such as the Lightweight Directory Access Protocol (LDAP), which typically is used for querying and modifying directory services. Also, when coupled to the CMTS 62, the SEIDB 92 exchanges information with the CMTS 62 using an appropriate protocol, e.g., LDAP.

The SEIDB 92 operates as a communications link between components involved in IP content bypass session flows, e.g., the IP content source 12, the CMTS 62 and other appropriate components. The SEIDB 92 can be any suitable database component, e.g., a database configured to receive and provide information according to the Lightweight Directory Access Protocol (LDAP). The SEIDB 92 is configured to store the necessary IP content bypass session encapsulation information and make such information available to the IP content source 12, the CMTS 62 and other system components as needed. The SEIDB 92 passes the needed bypass encapsulation information (in an appropriate format) to the necessary components within the system 90, instead of the system 90 having to pass such bypass encapsulation information through the PCMM interfaces. In this manner, IP content bypass flows can be made without having to modify numerous interfaces between existing system components within the PCMM framework.

The SEIDB 92 includes a first interface 94, a second interface 95, a controller 96 coupled between the first and second interfaces 94, 95, and a data storage element 98 coupled to the controller 96. The controller 96 generally processes IP content and other information received by the SEIDB 92. The controller also manages the movement of IP content and other information, such as bypass encapsulation information entries, to and from the data storage element 98. In addition to the content storage element 98, the SEIDB 92 can include at least one type of memory or memory unit (not shown) within the controller 96 and/or a storage unit or data storage unit coupled to the controller 96 for storing processing instructions and/or information received and/or created by the SEIDB 92.

The first and second interfaces 94, 95 are configured to receive IP content from and transmit IP content to other components within the system 90, e.g., the IP content source 12 and the CMTS 62. It should be understood that the interfaces 94, 95 can be a single input/output interface coupled to the controller 96. Also, it should be understood that one or more of the interfaces 94, 95 can be an interface configured to support more than one connection from more than one system component or device. The input and/or output interfaces 94, 95 are configured to provide any protocol interworking between the other components within the SEIDB 92 and the other components within the system 90 that are external to the SEIDB 92. Because all content distribution systems are not the same, the interfaces 94, 95 are configured to support the protocols of the particular system that is providing the content. Such protocol support functionality includes the identification of the content streams and corresponding protocol support required by the distribution system. Each distribution system typically will use a defined set of protocols.

One or more of the controller 96, the storage element 98 and the interfaces 94, 95 can be comprised partially or completely of any suitable structure or arrangement, e.g., one or more integrated circuits. Also, it should be understood that the SEIDB 92 includes other components, hardware and software (not shown) that are used for the operation of other features and functions of the SEIDB 92 not specifically described herein.

The SEIDB 92 can be partially or completely configured in the form of hardware circuitry and/or other hardware components within a larger device or group of components. Alternatively, the SEIDB 92 can be partially or completely configured in the form of software, e.g., as processing instructions and/or one or more sets of logic or computer code. In such configuration, the logic or processing instructions typically are stored in a data storage device, e.g., the content storage element 98 or other suitable data storage device. The data storage device typically is coupled to a processor or controller, e.g., the controller 96. The controller accesses the necessary instructions from the data storage element and executes the instructions or transfers the instructions to the appropriate location within the SEIDB 92.

Figure 7:
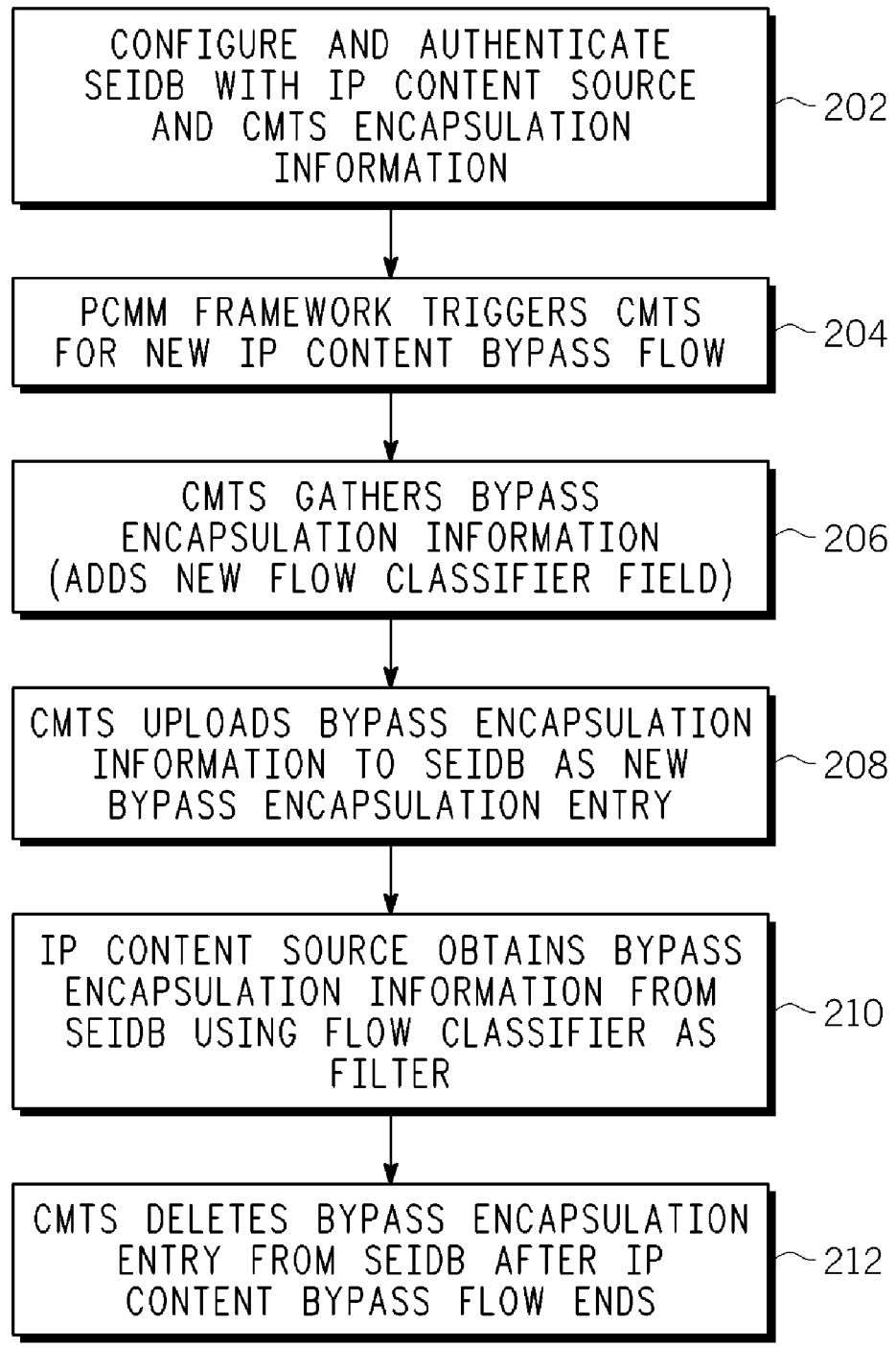
FIG. 7 is a flow chart that schematically illustrates a method for delivering IP content within a system that includes a bypass architecture and that includes a Session Encapsulation Information Database (SEIDB)

Referring now to FIG. 7, with continuing reference to FIG. 6, shown is a flow chart that schematically illustrates a method 200 for delivering IP content within a system that includes a bypass architecture and that includes the SEIDB 92. The operation of the SEIDB 92 within the IP content delivery system 90 will be discussed along with the method 200. The method 200 includes a step 202 of configuring the SEIDB 92 and authenticating the SEIDB 92 with bypass system components. Initially, the SEIDB 92 is configured (or preconfigured) with appropriate information about the IP content source 12, the CMTS 62 and any other system components involved in bypass session flows, e.g., between the IP content source 12 and the CMTS 62. The SEIDB 92 also is authenticated (or pre-authenticated) with the IP content source 12 and the CMTS 62. The preconfiguration and pre-authentication may require the addition of a database client within the IP content source 12. However, such addition typically is the only modification necessary to the IP content source 12 to implement the method 200.

Figure 8:
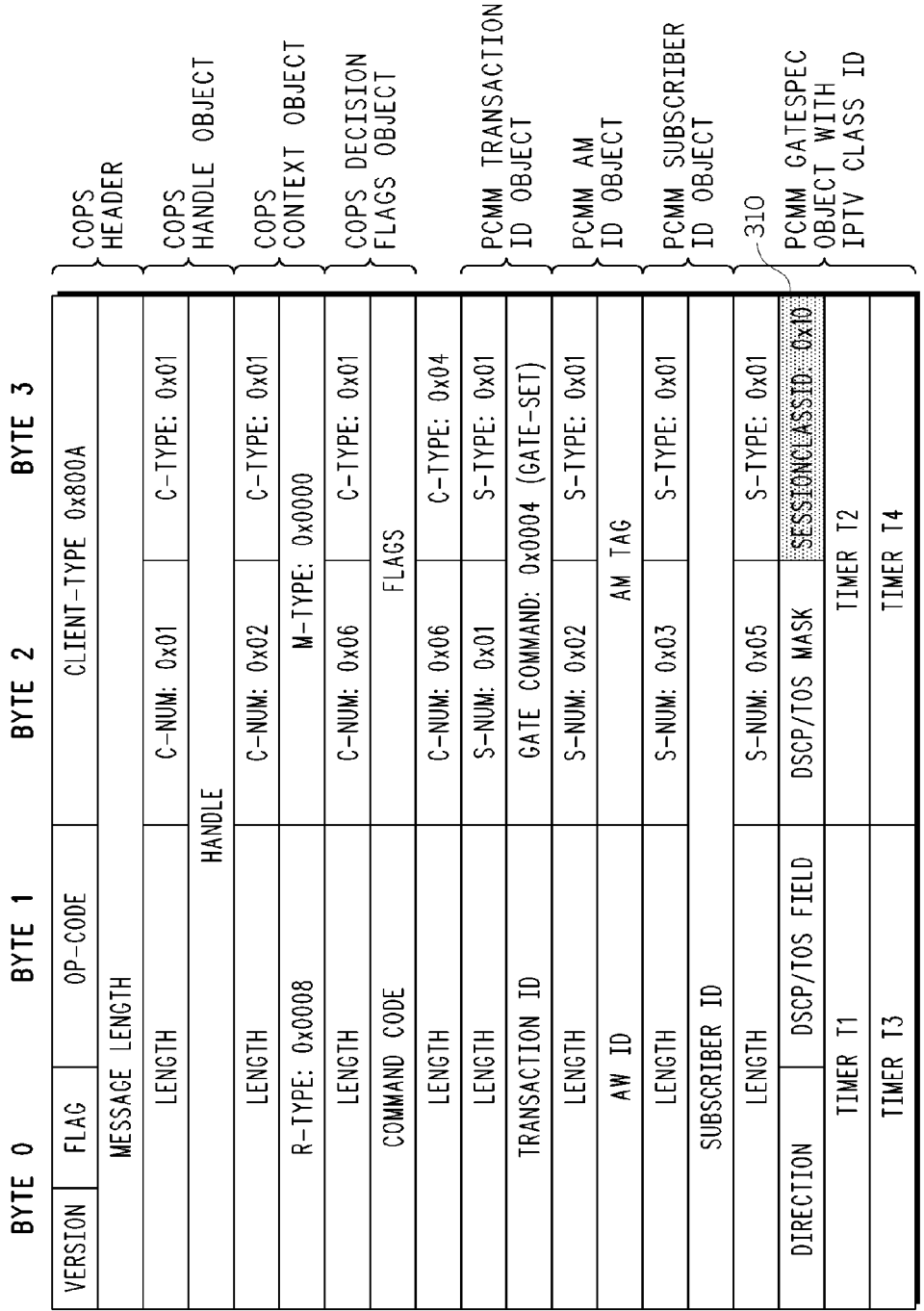
FIG. 8 is a block diagram of a PCMM Gate-Set command structure, including a SessionClassID command modification.

The method 200 includes a step 204 of the PCMM framework within the IP content delivery system 90 triggering the CMTS 62 for a new IP content bypass session. To initiate a new IP content bypass flow session, appropriate portions of the PCMM framework within the IP content delivery system 90 trigger or alert the CMTS 62 of a new IP content bypass session. For example, the PAM 86 can set a new IP content SessionClassID within the PCMM Gate-Set command to the CMTS 62. See FIG. 8, which shows a block diagram of a PCMM Gate-Set command structure 300, including a SessionClassID command modification 310. The PAM 86 can be configured or modified to generate the new IP content SessionClassID within the PCMM Gate-Set command. However, such configuration typically is the only modification necessary to the PAM 86 to implement the method 200.

The method 200 includes a step 206 of the CMTS 62 gathering bypass encapsulation information. The CMTS 62 is configured (or preconfigured) with appropriate information about the SEIDB 92 and authenticated (or pre-authenticated) with the SEIDB 92. The preconfiguration and pre-authentication may require the addition of a database client within the CMTS 62. However, such addition typically is one of only a few modifications to the CMTS 62 that may be required to implement the method 200.

In response to the CMTS 62 being triggered for a new IP content bypass session (step 204), the CMTS 62 gathers necessary bypass encapsulation information that will be needed for the IP content bypass flows. The CMTS 62 is configured to recognize the IP content SessionClassID to trigger the gathering of bypass encapsulation information. For example, the CMTS 62 can gather identification information related to the EQAM (e.g., EQAM ID and EQAM port ID) from the EQAM 28 and/or from other appropriate system components. Also, the CMTS 62 can gather identification information related to the CMTS 62 (e.g., CMTS MAC address) from the CMTS 62 and/or from other appropriate system components. Also, the CMTS 62 can gather identification information related to the one or more network elements 32 (e.g., CPE MAC address and Transmission Signal ID (TSID)) from the network elements 32 and/or from other appropriate system components. Other bypass encapsulation information includes DOCSIS encapsulation information (e.g., the DOCSIS MAC header: FC field, MAC_PARM), the DOCSIS MAC Domain Descriptor (MDD) and Layer 2 tunnel encapsulation information. The Layer 2 tunnel encapsulation information includes the IP header (EQAM IP address, DS field), the UDP header (EQAM UDP port number), the L2TP data header (L2TP session ID, version number, T bit), and the L2TP sub-layer header (PSP sub-layer header: flow ID, VCCV bit, S bit; and the DMPT sub-layer header: flow ID, VCCV bit, S bit).

As part of the bypass encapsulation information gathering step 206, the CMTS 62 adds or includes an additional flow classifier component or field as part of the new bypass encapsulation entry to be transferred from the CMTS 62 to the SEIDB 92. The added flow classifier provides a unique ID for the IP content bypass flows at both the CMTS 62 and the IP content source 12. Accordingly, as will be discussed hereinbelow, both the CMTS 62 and the IP content source 12 will be able to search the SEIDB 92 entries using this unique flow classifier. The elements of this additional flow classifier component can include the protocol type, the source IP address, the source port number, the destination IP address and the destination port number.

The method 200 includes a step 208 of the CMTS 62 uploading the new bypass encapsulation entry to the SEIDB 92. Once the CMTS 62 has gathered the necessary bypass encapsulation information related to the new IP content bypass session (including the additional of the unique flow classifier), the CMTS 62 uploads the new bypass encapsulation entry directly to the SEIDB 92. As a result, within the SEIDB 92, each entry of bypass encapsulation information for a bypass flow has a flow classifier component that uniquely identifies the respective bypass flow in a manner that allows both the CMTS 62 and the IP content source 12 to uniquely identify the bypass flow within the SEIDB 92.

It should be understood that once the CMTS 62 uploads the new bypass encapsulation entry directly to the SEIDB 92, the CMTS 62 continues with the rest of PCMM setup procedure for the IP content bypass flow, e.g., in a conventional manner. As discussed hereinabove, by using the existing PCMM framework to set up IP content bypass flows, no change to the existing system setup procedure is needed. With respect to the portion of the setup procedure that involves the transmission of the Gate-Set Acknowledgement command (Gate-Set-Ack) by the CMTS 62, the CMTS 62 can be modified easily to delay the transmission of the Gate-Set-Ack command until the uploading of the bypass encapsulation to the SEIDB 92 is complete.

The method 200 includes a step 210 of the IP content source 12 obtaining bypass encapsulation information from the SEIDB 92. Before the IP content bypass flow begins, the IP content source 12 establishes a communication with the SEIDB 92 to obtain the necessary bypass encapsulation information directly from the SEIDB 92. As discussed hereinabove, such bypass encapsulation information was provided to the SEIDB 92 by the CMTS 62. The IP content source 12 uses the flow classifier as a search filter item (or other appropriate means) to obtain the bypass encapsulation information from the SEIDB 92 needed by the IP content source 12 for proper IP content bypass data flows.

The method 200 also can include a step 212 of the CMTS 62 deleting the bypass encapsulation entry from the SEIDB 92 after the respective IP content bypass flow ends. Once the IP content bypass flow session of interest ends, the CMTS 62 is configured appropriately so that the CMTS 62 can delete the associated bypass encapsulation entry from the SEIDB 92.

The specific data flows associated with the IP content bypass flow setup now will be described with an example of using SIP as a session setup protocol. Initially, as discussed hereinabove, the SEIDB 92 is preconfigured with appropriate information about the IP content source 12, the CMTS 62 and any other system components involved in bypass session flows between the IP content source 12 and the CMTS 62. Also, as discussed hereinabove, the SEIDB 92 is pre-authenticated with the IP content source 12 and the CMTS 62.

First, an SIP INVITE command is issued from the network element 32 to the P-CSCF 82 to set up a new bypass flow. The P-CSCF 82 then forwards the SIP INVITE command to the IP content source 12 either directly or through other intermediate SIP signaling components (not shown). After receiving the Sip INVITE command, the IP content source 12 accepts the SIP invitation and transmits an SIP OK command to the P-CSCF 82 either directly or through other intermediate SIP signaling components. In response, the P-CSCF 82 transmits an AA (authorization application) REQUEST (AAR) command (Diameter protocol) to the PAM 86 to request QoS support for the bypass flow. In response to the AAR, the PAM 86 transmits a Gate-Set command (with a bypass flag set) to the Policy Server 88. The Policy Server 88 forwards the Gate-Set command (with a bypass flag set) to the CMTS 62 to set up the bypass flow after policy verifications.

In response to receiving the Gate-Set command, the CMTS 62 transmits an RTSP SETUP REQUEST command to the ERM 89 for EQAM resources. The ERM 89 then selects a suitable EQAM 28 and forwards the RTSP SETUP REQUEST command to that EQAM 28. Typically, an RTSP SETUP REQUEST command specifies parameters for transporting a media stream. Upon receipt of the RTSP SETUP REQUEST command, the EQAM 28 transmits an RTSP SETUP RESPONSE back to the ERM 89, which the ERM 89 forwards to the CMTS 62.

Upon receiving the RTSP SETUP RESPONSE, the CMTS 62 transmits a (DOCSIS) DBC (Dynamic Bonding Change) REQUEST command to the appropriate network element 32 to setup a non-primary DOCSIS downstream channel. In response, the network element 32 transmits a DBC RESPONSE back to the CMTS 62. The CMTS 62 then transits a DSA (Dynamic Service Addition) REQUEST command to the network element 32. In response, the network element 32 issues a DSA RESPONSE back to the CMTS 62. The CMTS 62 then transmits a DSA ACKNOWLEDGEMENT back to the network element 32.

The CMTS 62 then transmits a Layer Two Tunneling Protocol (L2TP) IC (Incoming Call) REQUEST command to the EQAM 28. In response, the EQAM 28 transmits an L2TP IC RESPONSE back to the CMTS 62. The CMTS 62 then transmits a L2TP ICCN (Incoming Call Connected) command back to the EQAM 28.

The CMTS 62 then transmits an LDAP ADD REQUEST command to the SEIDB 92 to upload gathered encapsulation information for the bypass flow. In response, the SEIDB 92 transmits an LDAP ADD RESPONSE back to the CMTS 62. The CMTS 62 transmits a Gate-Set-Acknowledge to the Policy Server 88, which forwards the Gate-Set-Acknowledge to the PAM 86. The PAM 86 then transmits an AA-ANSWER command to the P-CSCF 82 to indicate that QoS support for the bypass flow is ready. In response to the received AA-ANSWER command, the P-CSCF 82 transmits an SIP OK command to the network element 32 to complete the flow setup.

The IP content source 12 then can send an LDAP SEARCH REQUEST command to the SEIDB 92 before commencing the bypass flow transmission. Such request includes the flow classifier component for the flow. As discussed hereinabove, the flow classifier component uniquely identifies a bypass flow in a manner that allows the IP content source 12 (and the CMTS 62) to uniquely identify the bypass flow within the SEIDB 92. In response to the LDAP SEARCH REQUEST command, the SEIDB 92 sends the IP content source 12 an LDAP SEARCH RESPONSE. Such response includes the bypass encapsulation information needed by the IP content source 12 for proper IP content bypass flows. Afterwards, the IP content source 12 starts to transmit the bypass flow.

As discussed hereinabove, the use of the SEIDB 92 within the IP content delivery system provides many advantages. For example, by using the existing PCMM framework to set up IP content bypass flows, no change to the existing system setup procedure is required, while also achieving QoS provisioning for bypass flows. Also, the SEIDB 92 is independent of any one IP content source or server, thus allowing good scalability, e.g., for adding or removing IP content sources, and relatively easy manageability of multiple IP content sources. Also, such independence allows asynchronous operations between multiple IP content sources (e.g., video servers) and the CMTS 62.

The method shown in FIG. 7 may be implemented in a general, multi-purpose or single purpose processor. Such a processor will execute instructions, either at the assembly, compiled or machine-level, to perform that process. Those instructions can be written by one of ordinary skill in the art following the description of FIG. 7 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the bypass architecture apparatus, methods and systems herein described without departing from the spirit and scope of the invention as defined by the appended claims and their full scope of equivalents.

The invention claimed is:

1. A session encapsulation information database (SEIDB) apparatus for use in a system for transmitting internet protocol (IP) content from at least one IP content source to a downstream modulator and having a bypass architecture, wherein the system includes at least one network coupled between the content source and a cable modem termination system (CMTS), and wherein the downstream modulator is coupled to the at least one network and configured to transmit IP content to at least one end user network element coupled to the downstream modulator, comprising:

a first interface for coupling the session encapsulation information database apparatus to the at least one content source;

a controller coupled to the first interface; and a second interface coupled to the controller and for coupling the session encapsulation information database apparatus to the cable modem termination system, wherein the controller is configured to receive bypass encapsulation information from the cable modem termination system, the bypass encapsulation information including a bypass flow entry having a flow classifier component that uniquely identifies the bypass flow entry and includes data for transmitting IP content from the at least one network to the downstream modulator in such a way that the transmitted IP content bypasses the cable modem termination system, wherein the controller is configured to provide the bypass encapsulation information received from the cable modem termination system to the at least one content source responsive to receiving the flow classifier component from the content source, and wherein the at least one IP content source uses the bypass encapsulation information provided by the session encapsulation information database apparatus to transmit IP content from the at least one network to the downstream modulator in such a way that the transmitted IP content bypasses the cable modem termination system coupled to the at least one network.

2. The apparatus as recited in claim 1, wherein the bypass encapsulation information provided by the session encapsulation information database apparatus to the at least one IP content source includes at least one of DOCSIS framing information and downstream modulator tunneling information.

3. The apparatus as recited in claim 1, wherein at least one of the controller receives bypass encapsulation information from the cable modem termination system and the controller provides bypass encapsulation information to the at least one content source via a Lightweight Directory Access Protocol (LDAP).

4. The apparatus as recited in claim 1, wherein the session encapsulation information database apparatus is configured to delete at least a portion of the bypass encapsulation information received from the cable modem termination system after the end of an IP content bypass flow session from the at least one IP content source to the downstream modulator.

5. The apparatus as recited in claim 1, wherein at least one IP content source includes at least one of a video on demand (VOD) server, an IPTV broadcast video server, and an Internet video source.

6. The apparatus as recited in claim 1, wherein the downstream modulator further comprises an Edge Quadrature Amplitude Modulation (EQAM) modulator.

7. A method for transmitting internet protocol (IP) content from at least one IP content source to a downstream modulator within an IP content delivery system having a bypass architecture, wherein the IP content delivery system includes at least one network coupled between the at least one IP content source and a cable modem termination system (CMTS), and wherein the downstream modulator is coupled to the at least one network and configured to transmit IP content to at least one end user network element coupled to the downstream modulator, comprising the steps of:

receiving bypass encapsulation information from the cable modem termination system by a session encapsulation information database (SEIDB) coupled to the cable modem termination system, the bypass encapsulation information including a bypass flow entry having a flow classifier component that uniquely identifies the bypass flow entry and includes data for transmitting IP content from the at least one network to the downstream modulator in such a way that the transmitted IP content bypasses the cable modem termination system; and providing the bypass encapsulation information from the session encapsulation information database to the at least one IP content source responsive to receiving the flow classifier component from at least one IP content source, wherein the at least one IP content source uses the bypass encapsulation information provided by the session encapsulation information database apparatus to transmit IP content from the at least one network to the downstream modulator in such a way that the transmitted IP content bypasses the cable modem termination system coupled to the at least one network.

8. The method as recited in claim 7, wherein the bypass encapsulation information provided by the session encapsulation information database apparatus to the at least one IP content source includes at least one of DOCSIS framing information and downstream modulator tunneling information.

9. The method as recited in claim 7, wherein at least one of the bypass encapsulation information receiving step and the bypass encapsulation information providing step transmits bypass encapsulation information via a Lightweight Directory Access Protocol (LDAP).

10. The method as recited in claim 7, wherein the method further comprises the step of the cable modem termination system gathering bypass encapsulation information in response to a trigger for a new IP content bypass session.

11. The method as recited in claim 7, wherein the method further comprises the step of the cable modem termination system gathering bypass encapsulation information using a new SessionClassID within a PacketCable Multimedia (PCMM) Gate-Set command.

12. The method as recited in claim 7, wherein the method further comprises the step of the cable modem termination system instructing the session encapsulation information database apparatus to delete at least a portion of the bypass encapsulation information received thereby after the end of an IP content bypass flow session from the at least one IP content source to the downstream modulator.

13. The method as recited in claim 7, wherein the method further comprises the step of authenticating the session encapsulation information database with at least one of the cable modem termination system and the at least one IP content source.

14. A non-transitory computer readable medium storing instructions that, when executed on a programmed processor, carry out a method for transmitting internet protocol (IP) content from at least one IP content source to a downstream modulator within an IP content delivery system having a bypass architecture, wherein the IP content delivery system includes at least one network coupled between the at least one IP content source and a cable modem termination system (CMTS), and wherein the downstream modulator is coupled to the at least one network and configured to transmit IP content to at least one end user network element coupled to the downstream modulator, the instructions comprising:

instructions for receiving bypass encapsulation information from the cable modem termination system by a session encapsulation information database (SEIDB) coupled to the cable modem termination system, the bypass encapsulation information including a bypass flow entry having a flow classifier component that uniquely identifies the bypass flow entry and includes data for transmitting IP content from the at least one network to the downstream modulator in such a way that the transmitted IP content bypasses the cable modem termination system; and instructions for providing the bypass encapsulation information from the session encapsulation information database to the at least one IP content source responsive to receiving the flow classifier component from at least one IP content source, wherein the at least one IP content source uses the bypass encapsulation information to transmit IP content from the at least one network to the downstream modulator in such a way that the transmitted IP content bypasses the cable modem termination system coupled to the at least one network.

15. The non-transitory computer readable medium as recited in claim 14, wherein the bypass encapsulation information provided by the session encapsulation information database apparatus to the at least one IP content source includes at least one of DOCSIS framing information and downstream modulator tunneling information.

16. The non-transitory computer readable medium as recited in claim 14, wherein at least one of the controller receives bypass encapsulation information from the cable modem termination system and the controller provides bypass encapsulation information to the at least one content source via a Lightweight Directory Access Protocol (LDAP).

* * * * *